United States Patent [19]

Crane

[11] Patent Number: 4,723,919

[45] Date of Patent: Feb. 9, 1988

[54] TELEPHONE INTERFACE CONNECTION DEVICE

[75] Inventor: Robert A. Crane, Windham, Me.

[73] Assignee: GTE Products Corporation, Stamford, Conn.

[21] Appl. No.: 884,564

[22] Filed: Jul. 11, 1986

[51] Int. Cl.⁴ .......................................... H01R 13/52
[52] U.S. Cl. ................................. 439/521; 439/533; 439/709
[58] Field of Search ................. 339/44, 198 S, 96, 82, 339/242; 174/65 R; 439/519, 521, 527, 528, 533, 535, 709

[56] References Cited

U.S. PATENT DOCUMENTS

| 2,968,689 | 1/1961 | Johnson | 339/198 S |
| 4,266,683 | 5/1981 | Sellinger | 174/65 R X |
| 4,415,044 | 11/1983 | Davis | 339/198 S X |
| 4,425,016 | 1/1984 | Denckert | 339/82 |
| 4,508,411 | 4/1985 | Hughes et al. | 339/198 S X |

Primary Examiner—John McQuade
Attorney, Agent, or Firm—James Theodosopoulos

[57] ABSTRACT

The present invention relates to telephone network interface devices and includes a plug and a jack disposed in a block, the block being fitted within a housing. The location of the block within the housing and its manner of disposition protects the device from tampering and removal. The plug and jack are protected against the environment by a waterproof cover and resilient seals.

6 Claims, 3 Drawing Figures

TELEPHONE INTERFACE CONNECTION DEVICE

BACKGROUND OF THE INVENTION

The present invention relates to telephone network interface devices and particularly ones that are adapted to be disposed external of a building where a telephone is installed.

In the past, telephone network interface connectors have not generally been located outdoors. With the advent of deregulation of the telephone system, many changes have been required, among which is the responsibility of the subscribers to repair and maintain their own telephones. Quite advantageous to both the telephone company and the subscriber is a recent requirement that a device be installed on the premises of each subscriber which will permit testing of the integrity of that part of the subscriber loop owned by the telephone company. In this way, a subscriber may avoid service charges by the telephone company arising from subscriber complaints regarding faulty telephone service in those instances where the faulty service is in the portion of the subscriber loop not belonging to the telephone company. Quite advantageously to the telephone company, the device can be installed outside of the house and pinpoint a clear line of demarcation between the responsibility of the telephone company and the responsibility of the customer. The device must be weatherproof and must be capable of being solidly disposed on the outside of the premises of the telephone subscriber. Moreover, it is highly advantageous to construct a device that is not easily tampered with nor removed from the building upon which it is mounted. We have found that in most cases, if access to the device is limited, that tampering and removal can be reduced.

SUMMARY OF THE PRIOR ART

In buildings and throughout many homes, most frequently an RJ-11C connector is used which comprises a 4 or 6 wire modular plug and jack. Such a connector is shown in U.S. Pat. Nos. 3,954,320, 3,344,329 and 3,369,214. These prior art connectors are not suitable for outdoor use, however.

Quite suitable for use with the telephone network interface device of the present invention is the connector disclosed in co-pending application Ser. No. 683,739, now Pat. No. 4,588,238, filed by Mickelson et al. on Dec. 19, 1984. The Mickelson et al. application is owned by the same assignee as the present application. In the Mickelson et al. application, a telephone connector is disclosed which comprises a modular plug and a jack into which the plug is inserted. The plug has metal contacts for making electrical contact with matching electrical contacts in the jack. A mating surface is disposed on the plug which mates with a corresponding mating surface in the jack. When the plug is inserted into the jack, the gap between the two mating surfaces is small and a resilient sealing member is inserted within this small gap. The jack and plug are maintained in compression so that the resilient sealing member is under compression to insure that a seal is maintained between the two mating surfaces.

SUMMARY OF THE INVENTION

The telephone network interface device of the present invention is especially suitable for outdoor installation and is constructed to reduce the possibility of tampering with the assembly. It includes a housing with a base member and a cover connected to it by a hinge. The base member is formed of a floor and peripheral side walls extending from the floor, and the cover includes a front surface and side walls extending from the front surface. The cover and base member cooperate to form the housing. A telephone interface connector block is disposed in the base member and occupies a major portion of it. Knock-out ports are disposed on the floor and are arranged so that at least half of them are covered by the block. The block is removably secured to the floor by a threaded fastener which, preferably, has a head that is of an unusual shape so that the block cannot be removed easily by persons other than telephone repairmen. Preferably, the block includes a holder for a modular plug and jack so that a telephone subscriber can remove the plug and test a telephone that is suspected of being defective.

DESCRIPTION OF THE PREFERRED EMBODIMENTS

Figure 1:
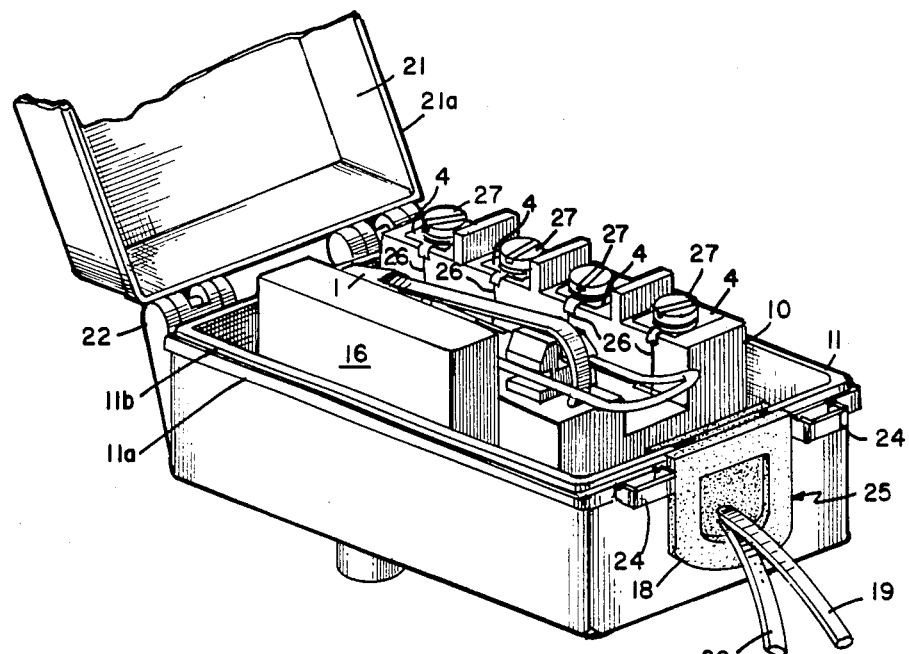
FIG. 1 is a perspective view of the lower portion of the telephone network interface device including the housing and a block with the plug and jack disposed within the block.

One example of a telephone network interface connector device with a plug and jack in accordance with this invention is shown in the drawings. It comprises a plug 1 disposed in a jack housing 3. Generally, there are four or six metal contacts on the plug 1 which make electrical contact with four or six corresponding metal contacts in the jack. The embodiment shown in the Figures has four contacts. The spacing within adjacent metal contacts is very small, typically only about 20 mils., which makes an unprotected connector especially susceptible to environmental degradation.

A surface on the housing 3 mates with, but is slightly separated from, a corresponding mating surface on plug 1, when plug 1 is inserted the jack. A resilient sealing member (not shown) is disposed in the gap between the surfaces of the jack and the housing and sealingly maintained in compression by means of a spring retainer clip 9 which, when locked in retainer 23, presses on the back of plug 1. A array of metal contacts 4 are connected to wires 26 each of which are connected to the electrical contacts in plug 1. The metal contacts are arranged in a fixed array by means of the heads of screws 27 that are disposed within holes formed in a block 10. Wires 20 running to the metal screws 27 from the customer's telephone system and to the telephone exchange can extend to the outside of the housing 11 through an encircling washer 18.

To perform a test of the telephone system, the subscriber simply disengages clip 9. Plug 1 can then be unplugged for testing either a suspected faulty telephone or the integrity of the telephone circuit, as desired.

The block 10 which holds the jack and plug is secured to the base member 11 by means of a fastener 12. Fastener 12 is preferably a bolt with a head of an uncommon shape, that is one that requires a special tool to turn it which is not commonly available to most home owners. Through the use of a fastener with a head of unusual shape, most subscribers will not have the tool necessary to remove the fastener 12 and thusly to prevent the customers or other persons from removing the block 10 from the base member 11. Fastener 12 is threaded into a receiving female threaded member 14, the latter being integrally molded onto the floor of the base member 11.

An open-ended container 16 for miscellaneous parts necessary for the proper maintenance of the telephone circuit (for the use by a telephone repairman) is snap-fit into a space between the block 10 and a side wall of the base member 11. A lip 16a extending from the edge of the open end of the container 16 engages the lower portion of block 10 and urges an open edge of side wall of container 16 against a side wall of base member 11. The lip 16a insures a snug but detachable fit so that the container 16 can be pried from the base member 11 as desired by the telephone repairman for access to the parts contained therein. Removal of container 16 is dependant upon removal of block 10, requiring the use of the special tool.

Figure 2:
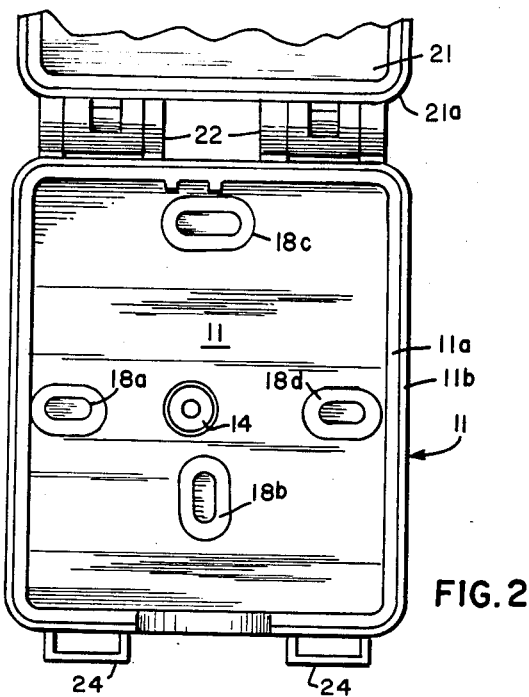
FIG. 2 is a top plan view of the telephone network interface device of the present invention and shows the inside of the housing ready to receive the block with the jack and plug.
Figure 3:
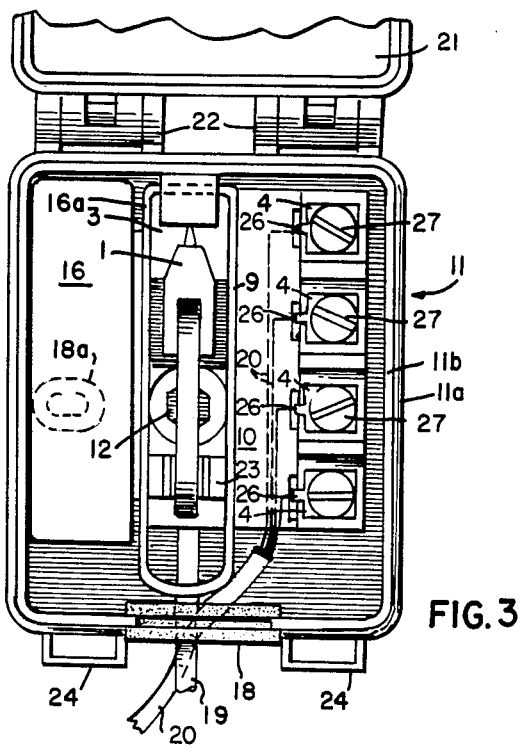
FIG. 3 is also a top plan view, similar to FIG. 2, but further showing the disposition of the block within the housing.

As can be seen in FIG. 2, a plurality of frangible knock out ports 18a, 18b, 18c and 18d are disposed on the floor of the base member 11. These ports are adapted to receive screws that will be used to attach the telephone network interface device to a building. The screws are not readily accessible to the telephone subscriber because they are hidden beneath the block 10 when it is attached to the base member 11 by means of fastener 12. Since fastener 12 has a head of an uncommon shape, it is difficult to gain access to the screws that are in the parts and remove the telephone interface connector device from the building upon which it is mounted or to tamper with the system. Knock-out port 18a is disposed beneath container 16 which is also difficult to access by a non-telephone employee. The four screws fitting into knock-out ports 18a, 18b, 18c and 18d are all hidden from possible tampering, three by the block and one by the container 16 that is held in place by the block 10.

A cover 21 is hingedly attached at 22 to the base member 11 of the housing. The edge 21a of the cover 21 fits snugly upon a flange 11a that is integrally molded onto base member 11. Edge 21a also fits over and around an inner flange 11b that extends upwardly to integrate with edge 21a so as to prevent the entrance of moisture, insects or other elements or items that would cause the deterioration of the telephone network system. A pair of U-shaped members 24 are affixed to the base member 11 and are arranged to receive mating engagement members (not shown), such as stepped wedges, which will enable either the customer or the telephone repairman to easily enter the housing as needed to service the equipment.

It is apparent that modifications and changes can be made within the spirit and scope of the present invention but it is our intention, however, only to be limited by the scope of the appended claims.

As our invention, we claim.

1. A telephone network interface device having limited accessibility and removability said device comprising:
    a housing formed of a base member including a floor and peripheral side walls extending from said floor, and a cover including a front surface and peripheral side walls extending from said front surface, the edges of the peripheral side walls of the base member and the cover cooperating to form the housing; and
    means detachably connecting the side walls of said floor to the side walls of said cover; and
    an array of frangible port means disposed on said floor, whereby to allow for the disposition of fasteners to attach said housing to a support; and
    a telephone interface connector disposed in said housing and including a block with a modular plug and a jack, said jack and said plug having matching electrical contacts when said plug is inserted into said jack; and
    electrical posts also diposed on said block, said posts being connected to the electrical contacts associated with said jack, said block occupying a significant portion of said base member, said block also covering from the inside and rendering inaccessible without removing the block at least three of the array of said frangible port means; and
    means for removably connecting said block to the floor of the housing, whereby said fasteners are covered, detachably, by said block, said removable connecting means being constructed to allow easy removal only with specialized tools.

2. The telephone network interface device according to claim 1 wherein the means to secure the block to the floor of the housing is a bolt having a head that is shaped such that it can be readily unscrewed only with a specialized tool.

3. The telephone network interface device according to claim 1 wherein the side walls extending from the floor terminate in a flange and the side walls extending from the front surface are arranged to fit about said flange.

4. The telephone network interface device according to claim 1 wherein the upper cover is hinged to the base member.

5. The telephone network interface device according to claim 1 wherein a space remains between the side of the block and the side wall of the base member and a container is disposed in said space, said container being detachably secured between the lower side wall and the lower portion of said block.

6. The telephone network interface device according to claim 5 wherein the container is open-ended and a lip extends from at least one edge of the open end to urge against said block, whereby removal of the container is dependent upon removal of said block.

* * * * *